US011347321B1

(12) United States Patent
Tan et al.

(10) Patent No.: US 11,347,321 B1
(45) Date of Patent: May 31, 2022

(54) SECURITY HARDENED FUNCTION KEYS AND INDICATORS

(71) Applicant: DELL PRODUCTS, LP, Round Rock, TX (US)

(72) Inventors: Geroncio O. Tan, Austin, TX (US); Bryan James Thornley, Burnet, TX (US); Adolfo S. Montero, Pflugerville, TX (US); Daniel L. Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/210,301

(22) Filed: Mar. 23, 2021

(51) Int. Cl.
*G06F 3/02* (2006.01)
*G06F 1/08* (2006.01)

(52) U.S. Cl.
CPC .............. *G06F 3/0202* (2013.01); *G06F 1/08* (2013.01)

(58) Field of Classification Search
CPC ................................. G06F 3/0202; G06F 1/08
See application file for complete search history.

(56) References Cited

U.S. PATENT DOCUMENTS

| 5,784,598 | A | * | 7/1998 | Griffith | ..................... G06F 1/08 713/601 |
| 8,156,346 | B2 | | 4/2012 | Kim | |
| 10,873,589 | B2 | | 12/2020 | Cheetancheri et al. | |
| 2005/0057515 | A1 | * | 3/2005 | Bathiche | ............... G06F 3/0202 345/168 |
| 2008/0238725 | A1 | * | 10/2008 | Gitzinger | .............. G06F 3/0202 341/22 |
| 2010/0049882 | A1 | * | 2/2010 | Tsao | ........................ G06F 3/023 710/18 |
| 2011/0102326 | A1 | * | 5/2011 | Casparian | .............. H01H 13/85 340/407.2 |
| 2019/0278951 | A1 | * | 9/2019 | Hershman | ............. G06F 3/0202 |
| 2019/0318134 | A1 | * | 10/2019 | Lin | ......................... G06F 21/83 |

* cited by examiner

*Primary Examiner* — Amit Chatly (74) *Attorney, Agent, or Firm* — Larson Newman, LLP (57) ABSTRACT

A key-press detection circuit for an information handling system includes a detector circuit, a RC circuit, and a latch circuit. The detector circuit is coupled to a keyboard matrix device, and operates to provides a clock signal in a first state when a particular key of the keyboard matrix device is pressed and to provide the clock signal in a second state when the particular key is not pressed. The RC circuit receives the clock signal and provides a timed clock signal in a third state for a predetermined amount of time in response to receiving the clock signal in the first state. After the predetermined amount of time, the RC circuit provides the timed clock signal in a fourth state. The latch circuit receives the timed clock signal at a clock input, receives a data signal at a data input, and latches an output signal in a same state as the data signal when the timed clock signal changes from the third state to the fourth state.

20 Claims, 6 Drawing Sheets

SECURITY HARDENED FUNCTION KEYS AND INDICATORS

FIELD OF THE DISCLOSURE

This disclosure generally relates to information handling systems, and more particularly relates to security hardened function keys and indicators on an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A key-press detection circuit for an information handling system may include a detector circuit, a RC circuit, and a latch circuit. The detector circuit may be coupled to a keyboard matrix device, and may operate to provides a clock signal in a first state when a particular key of the keyboard matrix device is pressed and to provide the clock signal in a second state when the particular key is not pressed. The RC circuit may receive the clock signal and provide a timed clock signal in a third state for a predetermined amount of time in response to receiving the clock signal in the first state. After the predetermined amount of time, the RC circuit may provide the timed clock signal in a fourth state. The latch circuit may receive the timed clock signal at a clock input, receive a data signal at a data input, and latch an output signal in a same state as the data signal when the timed clock signal changes from the third state to the fourth state.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
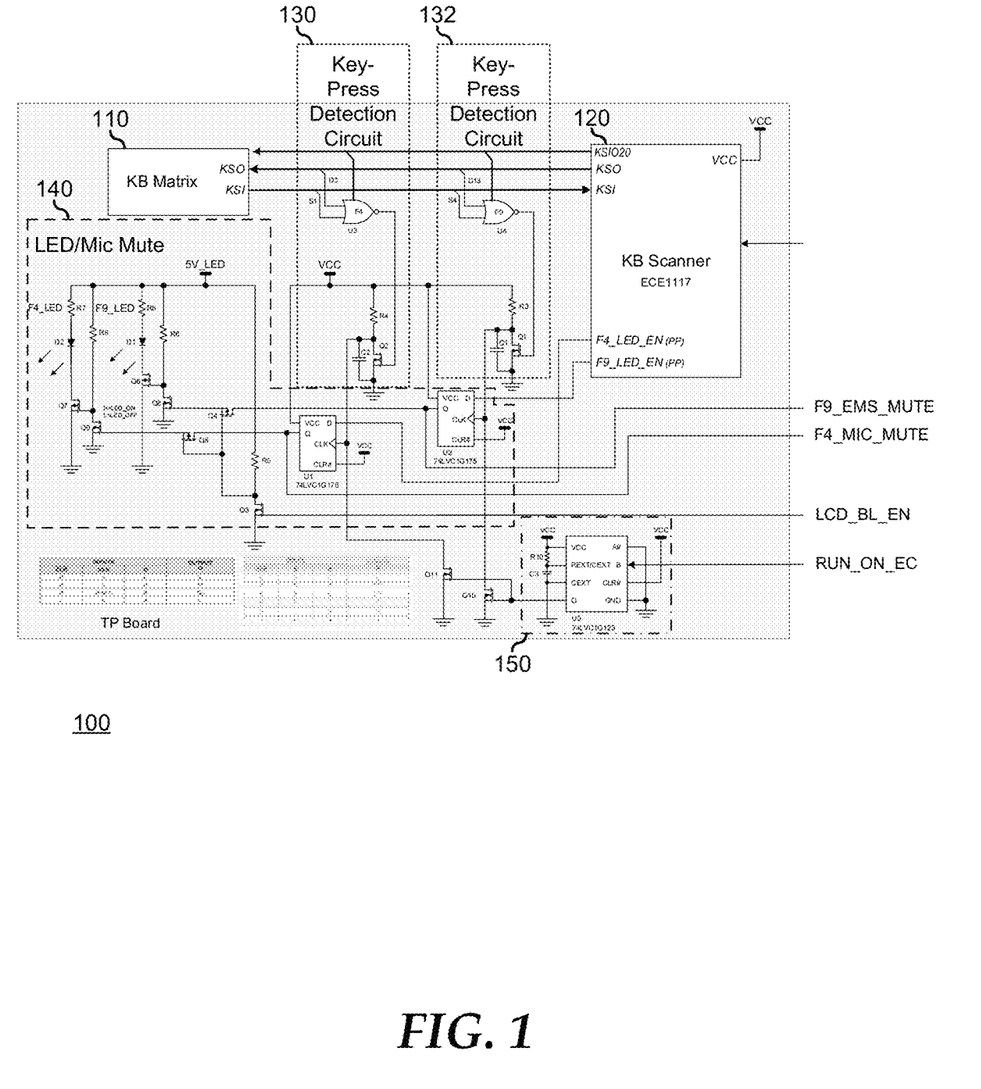
FIG. 1 is a circuit diagram illustrating a keyboard circuit of an information handling system according to an embodiment of the current disclosure.

FIG. 1 illustrates a keyboard circuit 100 for an information handling system. Keyboard circuit 100 includes a keyboard matrix 110, a keyboard scanner 120, key-press detection circuits 130 and 132, a control activation circuit 140 including activation circuits associated with each of the key-press detection circuits, and a start-up override circuit 150. Key stroke detection in an information handling system is typically provided as a software function. That is, while the pressing of a key is a physical act, the interpretation of the key stroke, and the activation of any functions or features associated with the key stroke are handled within circuitry and software of the information handling system that are subject to malicious attack. For example, the press of particular function key may be utilized for the muting and unmuting of a microphone or for the opening or closing of an electro-mechanical (EM) camera shutter. However, such a key stroke does not typically result in the direct application of a gating to the function, such as by use of a relay or transistor, but instead, the key stroke is received by a keyboard scanner which interprets the key stroke for various hardware and software agents which in turn activates the associated function.

The inventors of the current disclosure have understood that such a key stroke detection scheme is susceptible to malicious attack. For example, malicious software can be installed onto an information handling system that activates the microphone, but that does not activate a microphone indicator LED. Other malicious software can be installed that opens an EM camera shutter to capture a single frame, before reclosing the shutter. Here, even if a camera indicator LED is hardwired with the EM camera shutter, the short duration that the EM camera shutter is left open is typically such that the short activation of the indicator LED is undetected by the user of the information handling system.

In a particular embodiment, a security hardened key of keyboard matrix 110 is isolated by hardware from the software control of the associated function by one of key-press detection circuit 130 and 132. In the illustrated embodiment, the "Function 4" key is utilized to toggle the enabling and disabling of a microphone (not illustrated) and is security hardened by key-press detection circuit 130, and the "Function 9" key is utilized to toggle the enabling of an EM camera shutter (not illustrated) and is security hardened by key-press detection circuit 132. Here, when a user presses a security hardened key, the key stroke is received by, e.g., key-press detection circuit 130, and a clock signal (active-low) is provided to a latch (inverting input), arming the latch. In particular, the scan line associated with the security hardened key is provided as a first input to a NOR-gate, and the index line associated with the security hardened key is provided to a second input of the NOR-gate.

Thus, only when the security hardened key is depressed, and both the associated scan line and the associated index line are pulled high does the output of the NOR-gate go low, clocking the latch, and all other key strokes are blocked from clocking the latch. The clock signal is held low by an RC circuit for a short duration of time sufficient for keyboard scanner 120 to assert an output signal on a GPIO pin associated with the security hardened key. The GPIO pin is connected to the data input of the latch, and, with the clock signal asserted on the latch, the state of the associated GPIO is provided on the output of the latch. Then, when the RC circuit pulls the clock signal high, the state of the GPIO pin is latched at the output of the latch until a new press of the security hardened key is received. In this way, only by physically pressing the security hardened key is the state of the associated function able to be changed.

In a particular embodiment, keyboard scanner 120 operates to provide a pre-scan mode where all scan lines to the keyboard matrix are held low, such that any key press in the associated index row may trigger the latch. Here, key-press detection circuits 130 and 132 include an enable input to the OR-gate that is associated with a pre-scan output signal (such as a KSO20 output) that blocks the action of the OR-gate during the pre-scan mode. Key-press detection circuits 130 and 132 as described herein may be implemented as a set of discrete components, such as FET transistors, resistors, capacitors, and the like, may be implemented as an integrated device, or may be implemented as a combination thereof. In a particular embodiment, a NOR-gate may be implemented as a pair of transistors in series, as is known in the art, and the enabling of the NOR-gate may be provided by gated buffer integrated circuit to cut power to the transistors during the pre-scan mode.

Figure 2:
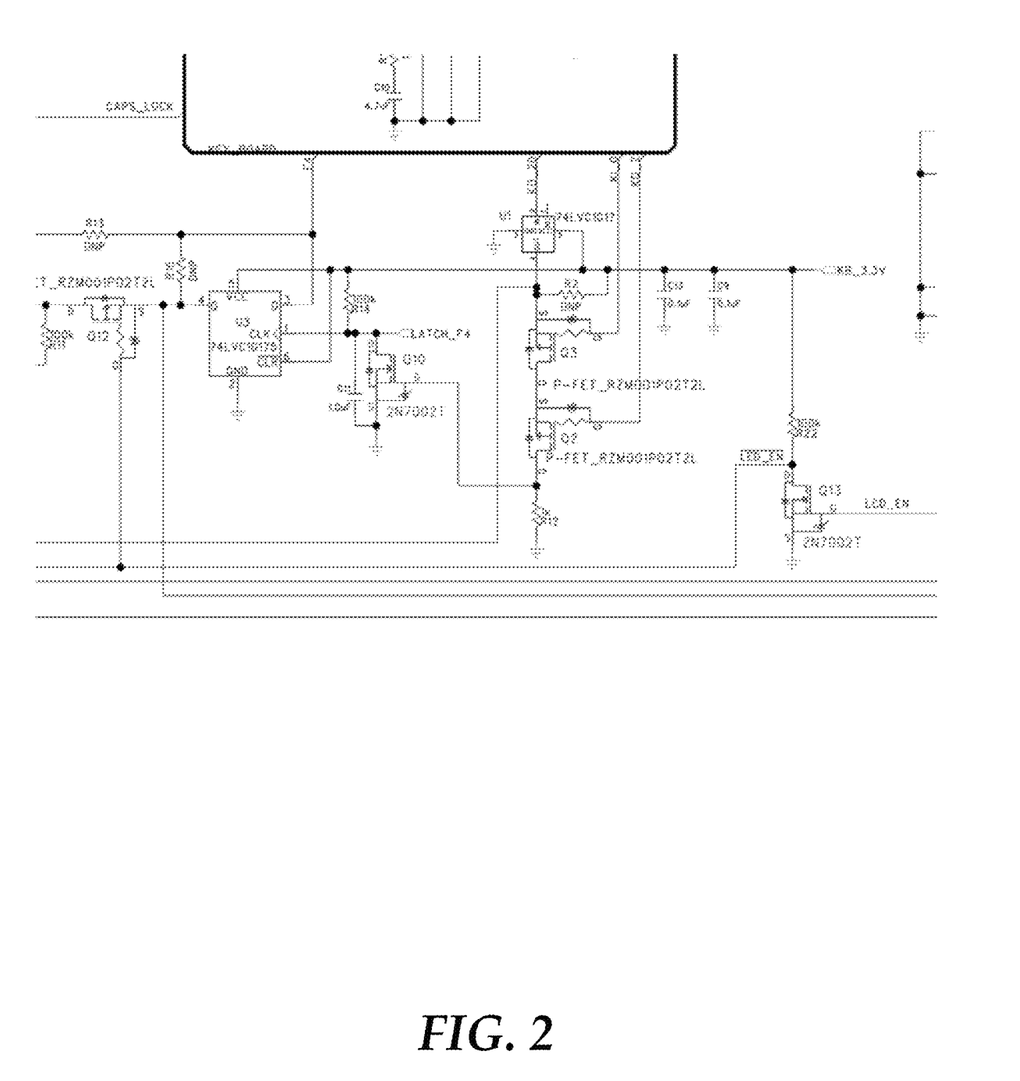
FIG. 2 is a circuit diagram of a portion of a keyboard circuit of an information handling system according to another embodiment of the current disclosure.

An exemplary key-press detection circuit is illustrated in FIG. 2, where the NOR-gate is implemented as transistors Q2 and Q3, the enable signal is implemented as integrated circuit U1, the RC circuit is implemented as transistor Q10, capacitor C11, and resistor R14, and the latch is implemented as integrated circuit U3.

As noted above, a typical information handling system may implement a function activated by a key stroke as an output on a first GPIO of the information handling system, and implement an indicator for the function as an output on a second GPIO. Here, such an information handling system may be subject to an exploit where the function is maliciously manipulated by enabling or disabling the function without the corresponding enabling or disabling of the indication. In a particular embodiment, control activation circuit 140 is provided to mitigate the risk from such an exploit. Here, the latch output from key-press detection circuit 130 is provided to control activation circuit 140 to activate or deactivate a LED associated with the microphone, and the output from that latch is also provided as the microphone activation signal. It will be understood that a typical audio CODEC associated with the microphone will include at least one activation signal input to manage the enabling and disabling of the audio CODEC. Other details of audio CODECs and the enabling and disabling thereof are known in the art and will not be further described herein except as needed to describe the current embodiments.

The latch output from key-press detection circuit 132 is provided to control activation circuit 140 to activate or deactivate a LED associated with the EM camera shutter, and the output from that latch is also provided as the EM camera shutter activation signal. It will be understood that a typical audio CODEC associated with the microphone will include at least one activation signal input to manage the enabling and disabling of the audio CODEC. Other details of EM camera shutters and the enabling and disabling thereof are known in the art and will not be further described herein except as needed to describe the current embodiments. In this way, the LED indicators always accurately reflects the state of the audio CODEC and the EM camera shutter. In a particular embodiment, the outputs from the latches of key-press detection circuits 130 and 132 are provided to an embedded controller of the information handling system as needed or desired.

A potential exploit of keyboard circuit 100 remains where the output (for example KSO20) that enables the OR-gates of key-press detection circuits 130 and 132 is hacked to enable the OR-gates, such that, when any key in the same row as the security hardened key is pressed, the state of the output of the associated latch can be changed. However, with both the indicator LED and the functional output being driven by the latch, there will be no case of an exploit where the visible indication is not in harmony with the state of the function, thus ensuring that such an exploit is detectable.

In a particular embodiment, it may be desirable for the information handling system to retain the functional state of the security hardened keys after a system power event, such as a system reboot or a resume event from a sleep state. Here, startup override circuit 150, a one-shot integrated circuit, is provided. Here, when the information handling system is powered up, a RUN_ON_EC signal triggers startup override circuit 150 for a short duration, and the output of the startup override circuit is provided to transistors Q10 and Q11 to trigger the latches of key-press detection circuits 130 and 132. Keyboard scanner 120 provides the outputs to the data inputs of the latches that are in the same state as when the information handling system was powered down. For example, an embedded controller of the information handling system may persistently store the state of the microphone and EM camera shutter before the information handling system is powered down. Then, on power up, the embedded controller can provoke the RUN_ON_EC signal to startup override circuit 150 and can direct keyboard scanner 120 to provide that appropriate outputs to the latch inputs in accordance with the values that were persistently stored.

Figure 3:
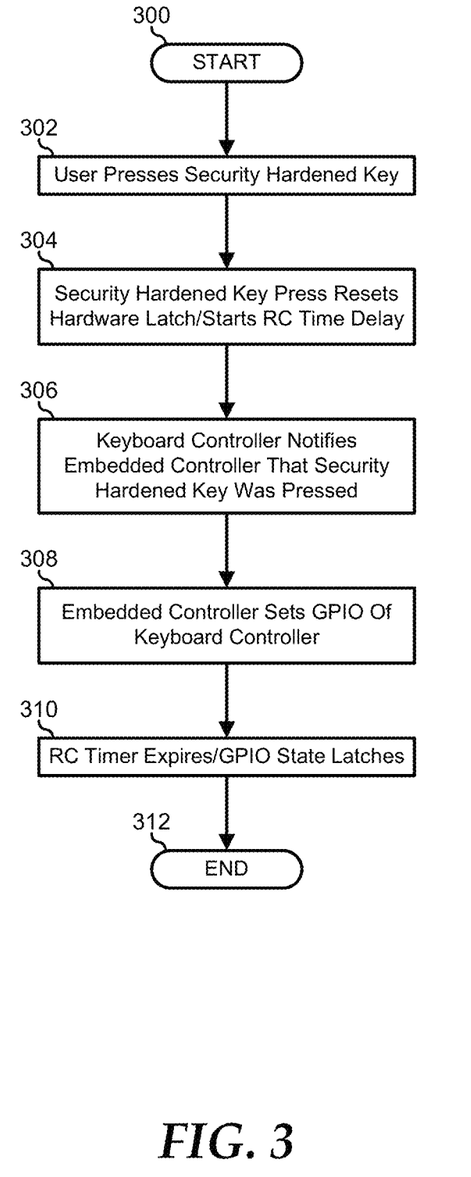
FIG. 3 is a flowchart illustrating a method for providing a security hardened key in an information handling system according to an embodiment of the current disclosure.

FIG. 3 illustrates a method for providing a security hardened key in an information handling system starting at block 300. A security hardened key is pressed in block 302 and the key press resets a hardware latch and starts a RC time delay in block 304. A keyboard controller notifies an embedded controller of that the security hardened key was pressed in block 306, and the embedded controller sets a GPIO of the keyboard controller that is associated with the security hardened key in block 308. The GPIO output is provided to a data input of the hardware latch. The RC timer expires, thereby latching the state of the GPIO at the latch output, and the latch output turns on or off a LED indicator associated with the security hardened key and also enables or disables a function associated with the security hardened key in block 310, and the method ends in block 312.

Figure 4:
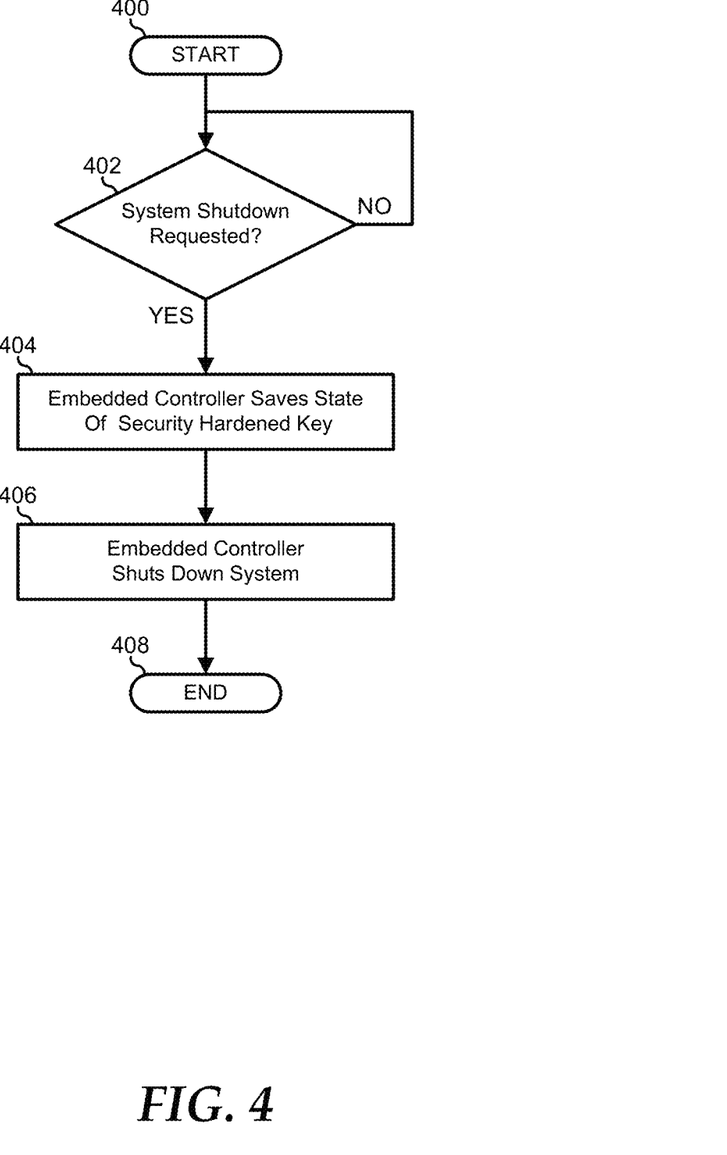
FIG. 4 is a flowchart illustrating a method for retaining state information associated with a security hardened key according to an embodiment of the current disclosure.

FIG. 4 illustrates a method for retaining state information associated with a security hardened key starting at block 400. A decision is made as to whether or not a shut down is desired on the information handling system in decision block 402. If not, the "N" branch of decision block 402 is taken and the method loops through decision block 402 until a shut down is desired on the information handling system. When a shut down is desired on the information handling system, the "Y" branch of decision block 402 is taken and an embedded controller of the information handling system saves the state of the security hardened key to a non-volatile memory in block 404. The embedded controller shuts down the information handling system in block 406, and the method ends in block 408.

Figure 5:
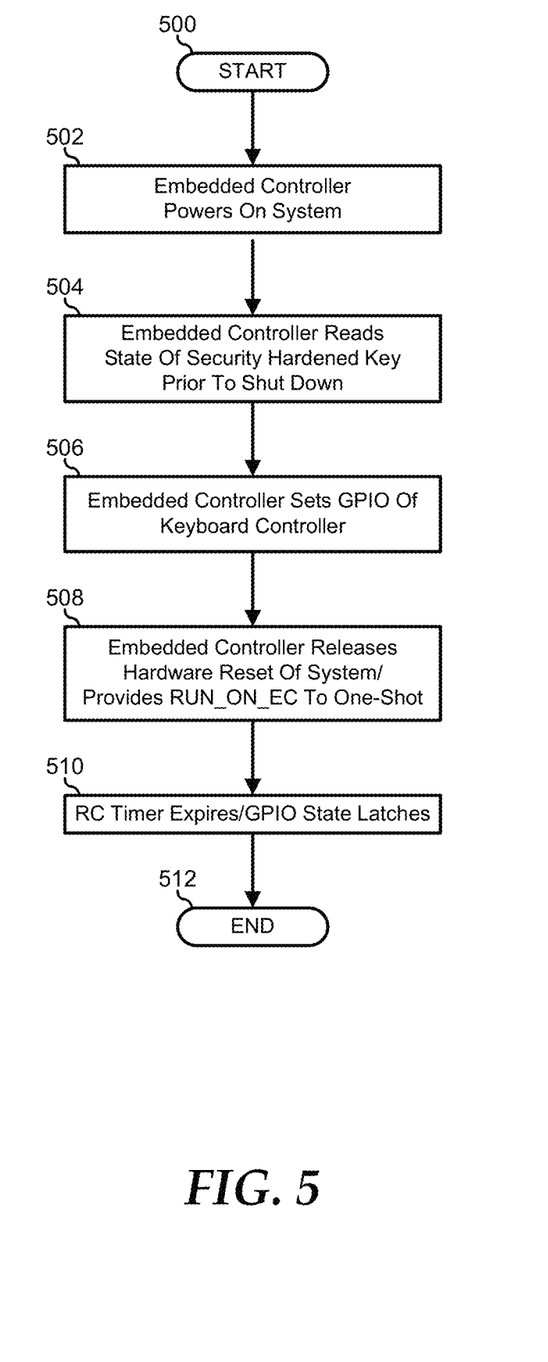
FIG. 5 is a flowchart illustrating a method for restoring state information associated with a security hardened key according to an embodiment of the current disclosure.

FIG. 5 illustrates a method for restoring state information associated with a security hardened key stating at block 500. The embedded controller powers on the information handling system in block 502 and the embedded controller reads the state of the function associated with the security hardened key from the non-volatile memory in block 504. The embedded controller sets the GPIO of the keyboard controller that is associated with the security hardened key to the state found from the non-volatile memory in block 506. The embedded controller then releases the hardware reset of the information handling system and provides the RUN_ON_EC signal to a one-shot circuit in block 508. The RUN_ON_ED signal clocks the clock input of the latch of a key-press detection circuit associated with the security hardened key, and the latch output turns on or off a LED indicator associated with the security hardened key and also enables or disables a function associated with the security hardened key in block 510, and the method ends in block 512.

Figure 6:
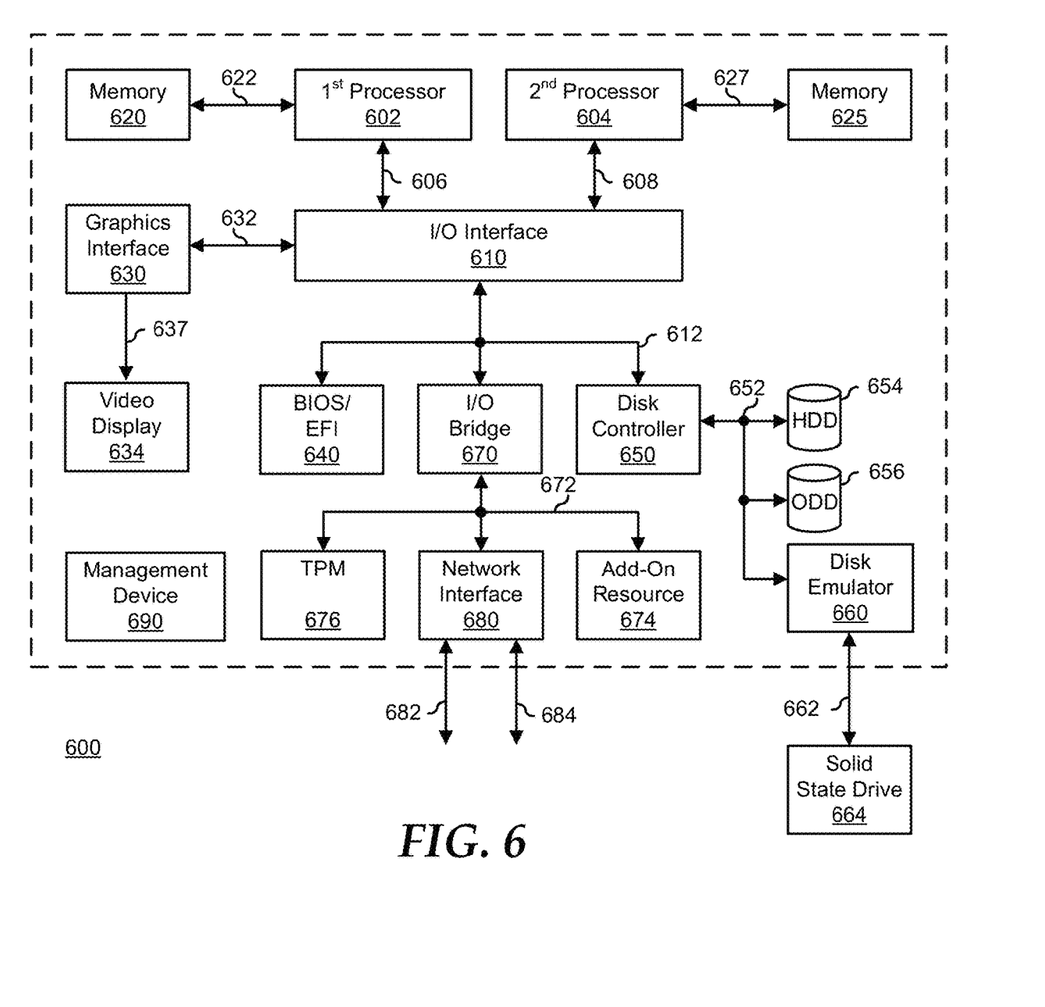
FIG. 6 is a block diagram illustrating a generalized information handling system according to another embodiment of the current disclosure.

FIG. 6 illustrates a generalized embodiment of an information handling system 600. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described below, and operates to perform one or more of the methods described below. Information handling system 600 includes a processors 602 and 604, an input/output (I/O) interface 610, memories 620 and 625, a graphics interface 630, a basic input and output system/universal extensible firmware interface (BIOS/UEFI) module 640, a disk controller 650, a hard disk drive (HDD) 654, an optical disk drive (ODD) 656, a disk emulator 660 connected to an external solid state drive (SSD) 662, an I/O bridge 670, one or more add-on resources 674, a trusted platform module (TPM) 676, a network interface 680, a management device 690, and a power supply 695. Processors 602 and 604, I/O interface 610, memory 620, graphics interface 630, BIOS/UEFI module 640, disk controller 650, HDD 654, ODD 656, disk emulator 660, SSD 662, I/O bridge 670, add-on resources 674, TPM 676, and network interface 680 operate together to provide a host environment of information handling system 600 that operates to provide the data processing functionality of the information handling system. The host environment operates to execute machine-executable code, including platform BIOS/UEFI code, device firmware, operating system code, applications, programs, and the like, to perform the data processing tasks associated with information handling system 600.

In the host environment, processor 602 is connected to I/O interface 610 via processor interface 606, and processor 604 is connected to the I/O interface via processor interface 608. Memory 620 is connected to processor 602 via a memory interface 622. Memory 625 is connected to processor 604 via a memory interface 627. Graphics interface 630 is connected to I/O interface 610 via a graphics interface 632, and provides a video display output 636 to a video display 634. In a particular embodiment, information handling system 600 includes separate memories that are dedicated to each of processors 602 and 604 via separate memory interfaces. An example of memories 620 and 630 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 640, disk controller 650, and I/O bridge 670 are connected to I/O interface 610 via an I/O channel 612. An example of I/O channel 612 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 610 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 640 includes BIOS/UEFI code operable to detect resources within information handling system 600, to provide drivers for the resources, initialize the resources, and access the resources. BIOS/UEFI module 640 includes code that operates to detect resources within information handling system 600, to provide drivers for the resources, to initialize the resources, and to access the resources.

Disk controller 650 includes a disk interface 652 that connects the disk controller to HDD 654, to ODD 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits SSD 664 to be connected to information handling system 600 via an external interface 662. An example of external interface 662 includes a USB interface, an IEEE 1394 (Firewire) interface, a proprietary interface, or a combination thereof. Alternatively, solid-state drive 664 can be disposed within information handling system 600.

I/O bridge 670 includes a peripheral interface 672 that connects the I/O bridge to add-on resource 674, to TPM 676, and to network interface 680. Peripheral interface 672 can be the same type of interface as I/O channel 612, or can be a different type of interface. As such, I/O bridge 670 extends the capacity of I/O channel 612 when peripheral interface 672 and the I/O channel are of the same type, and the I/O bridge translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as I/O interface 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Management device 690 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 600. In particular, management device 690 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 600, such as system cooling fans and power supplies.

Management device 690 can include a network connection to an external management system, and the management device can communicate with the management system to report status information for information handling system 600, to receive BIOS/UEFI or system firmware updates, or to perform other task for managing and controlling the operation of information handling system 600. Management device 690 can operate off of a separate power plane from the components of the host environment so that the management device receives power to manage information handling system 600 when the information handling system is otherwise shut down. An example of management device 690 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 690 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A key-press detection circuit for an information handling system, the key-press detection circuit comprising:
   a detector circuit coupled to a keyboard matrix device, the detector circuit configured to provide a clock signal in a first state when a particular key of the keyboard matrix device is pressed and to provide the clock signal in a second state when the particular key is not pressed;
   a resistor-capacitor (RC) circuit configured to receive the clock signal and to provide a timed clock signal in a third state for a predetermined amount of time in response to receiving the clock signal in the first state, wherein after the predetermined amount of time, the RC circuit is further configured to provide the timed clock signal in a fourth state; and
   a latch circuit configured to receive the timed clock signal at a clock input, to receive a data signal at a data input, and to latch an output signal in a same state as the data signal when the timed clock signal changes from the third state to the fourth state.

2. The key-press detection circuit of claim 1, wherein the detector circuit comprises a NOR-gate having a first logic input, a second logic input, and a logic output.

3. The key-press detection circuit of claim 2, wherein the first logic input is coupled to a selected one of a plurality of row enable signals to the keyboard matrix, the selected row enable signal being associated with the particular key.

4. The key-press detection circuit of claim 3, wherein the second logic input is coupled to a selected one of a plurality of column enable signals from the keyboard matrix, the selected column enable signal being associated with the particular key.

5. The key-press detection circuit of claim 4, wherein the first logic input and the logic second input are both in a low state only when the particular key is pressed.

6. The key-press detection circuit of claim 5, wherein, when the first logic input and the logic second input are both in the low state, the logic output is in the first state.

7. The key-press detection circuit of claim 1, wherein the output signal operates to control a function associated with the particular key.

8. The key-press detection circuit of claim 7, wherein the output signal further operates to drive an indicator associated with the function.

9. The key-press detection circuit of claim 1, wherein the particular key is associated with a microphone function of the information handling system.

10. The key-press detection circuit of claim 1, wherein the particular key is associated with an electromagnetic camera shutter of the information handling system.

11. A method, comprising:
- receiving, at a detector circuit coupled to a keyboard matrix device, an indication that a key of the keyboard matrix has been pressed;
- determining that the key is a particular key;
- providing a clock signal in a first state when the particular key is pressed;
- providing the clock signal in a second state when the particular key is not pressed;
- receiving, at a resistor-capacitor circuit, the clock signal;
- providing a timed clock signal in a third state for a predetermined amount of time in response to receiving the clock signal in the first state;
- providing, after the predetermined amount of time, the timed clock signal in a fourth state;
- receiving, by a latch circuit, the timed clock signal at a clock input;
- receiving, by the latch circuit, a data signal at a data input; and
- latching an output signal in a same state as the data signal when the timed clock signal changes from the third state to the fourth state.

12. The method of claim 11, wherein the detector circuit comprises a NOR-gate having a first logic input, a second logic input, and a logic output.

13. The method of claim 12, further comprising coupling the first logic input to a selected one of a plurality of row enable signals to the keyboard matrix, the selected row enable signal being associated with the particular key.

14. The method of claim 13, further comprising coupling the second logic input to a selected one of a plurality of column enable signals from the keyboard matrix, the selected column enable signal being associated with the particular key.

15. The method of claim 14, wherein the first logic input and the logic second input are both in a low state only when the particular key is pressed.

16. The method of claim 15, wherein, when the first logic input and the logic second input are both in the low state, the logic output is in the first state.

17. The method of claim 11, further comprising controlling a function associated with the particular key based upon the output signal.

18. The method of claim 17, further comprising driving an indicator associated with the function based upon the output signal.

19. The method of claim 11, wherein the particular key is associated with one of a microphone function of the information handling system, and an electromagnetic camera shutter of the information handling system.

20. A keyboard circuit of an information handling system, the keyboard circuit comprising:
- key-press detection circuit, including:
    - a detector circuit coupled to a keyboard matrix device, the detector circuit configured to provide a clock signal in a first state when a particular key of the keyboard matrix device is pressed and to provide the clock signal in a second state when the particular key is not pressed;
    - a resistor-capacitor (RC) circuit configured to receive the clock signal and to provide a timed clock signal in a third state for a predetermined amount of time in response to receiving the clock signal in the first state, wherein after the predetermined amount of time, the RC circuit is further configured to provide the timed clock signal in a fourth state; and
    - a latch circuit configured to receive the timed clock signal at a clock input, to receive a data signal at a data input, and to latch an output signal in a same state as the data signal when the timed clock signal changes from the third state to the fourth state;
- a startup circuit configured to drive the timed clock signal to the third state when the information handling system is powered up; and
- an embedded controller configured to retrieve a stored data value when the information handling system is powered up, and to provide the data value to the data input while the startup circuit drives the timed clock signal.

* * * * *